United States Patent [19]
Gebhard

[11] 3,917,302
[45] Nov. 4, 1975

[54] FOLDABLE CANOPY FOR BABY CARRIAGES

[75] Inventor: Albert W. Gebhard, Boulder, Colo.
[73] Assignee: Gerico, Inc., Boulder, Colo.
[22] Filed: June 17, 1974
[21] Appl. No.: 480,153

[52] U.S. Cl. ............... 280/36 B; 280/41 B; 296/102
[51] Int. Cl.² ......................................... B62B 11/00
[58] Field of Search ........ 280/36 B, 39, 41 A, 41 B, 280/42; 296/102

[56] References Cited
UNITED STATES PATENTS
2,982,562  5/1961  Gladstein .......................... 280/36 B
3,390,893  7/1968  MacLaren ......................... 280/36 B Primary Examiner—Robert R. Song
Attorney, Agent, or Firm—John E. Reilly; Earl C. Hancock

[57] ABSTRACT

A foldable canopy is specifically adapted for use with baby carriages or strollers of the type which are transversely foldable into a compact stored position, the canopy being characterized in that it is releasably connectable adjacent to the upper handle portions of the stroller either for direct forward horizontal extension over the seat portion, or is pivotal rearwardly to extend rearwardly of and in closely spaced relation to the handle of the stroller; and from either position can be selectively folded inwardly with the stroller into a compact stored position.

4 Claims, 8 Drawing Figures

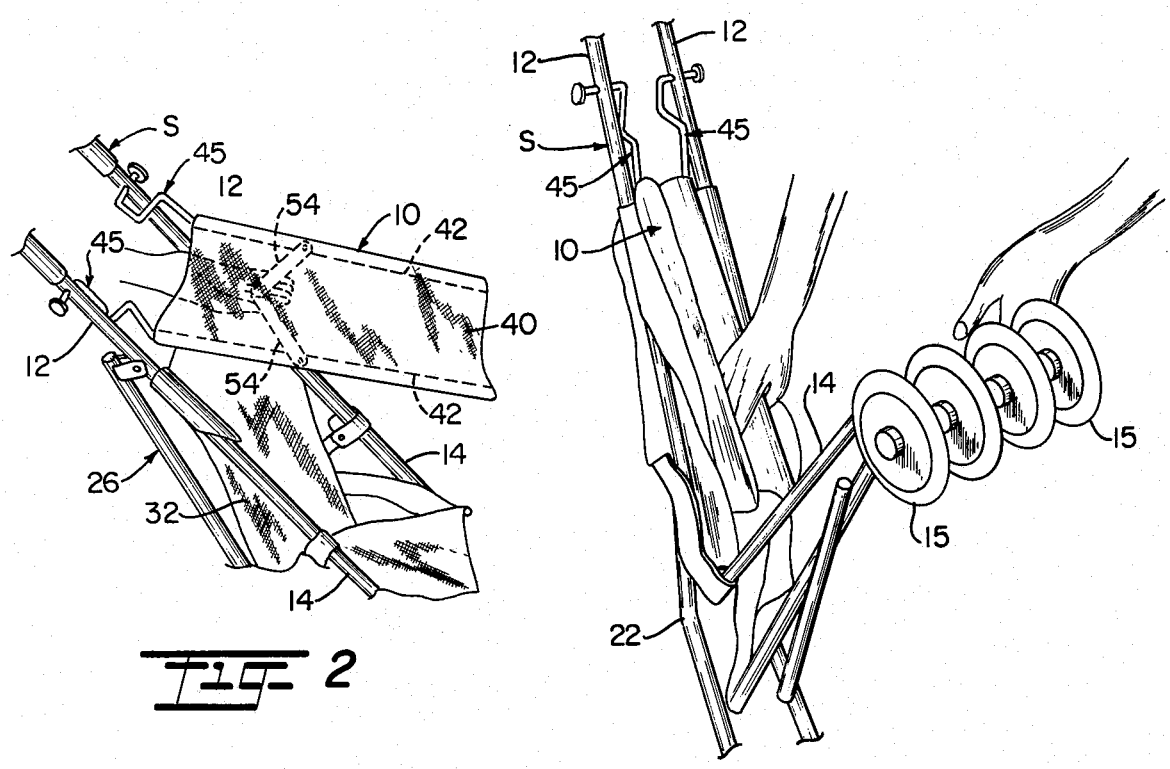
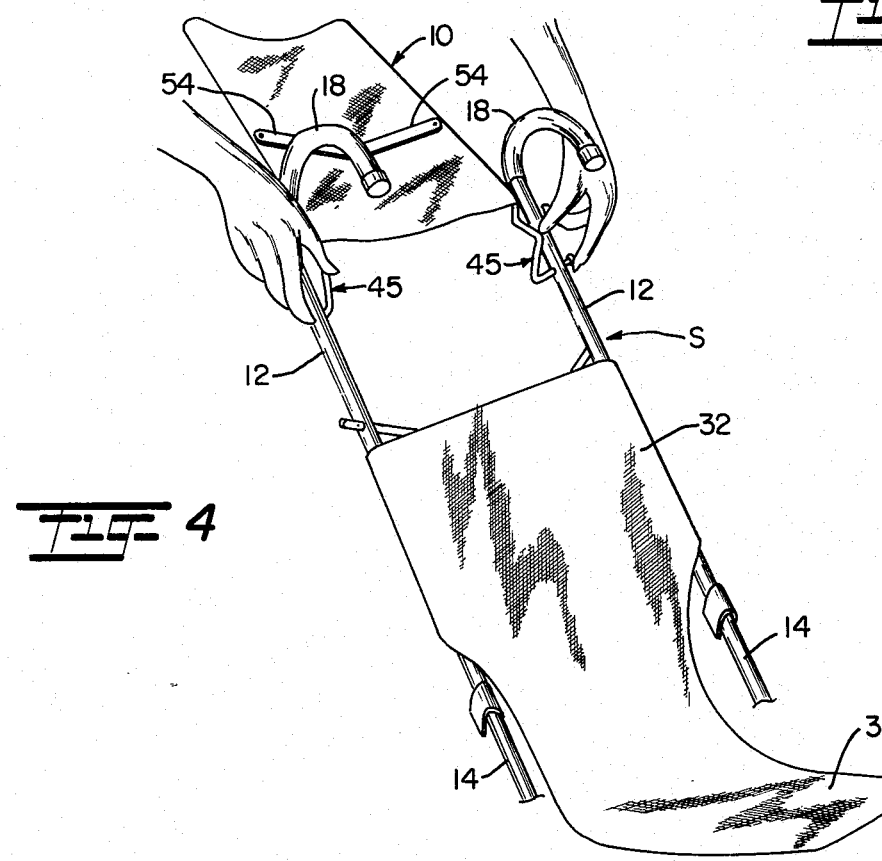

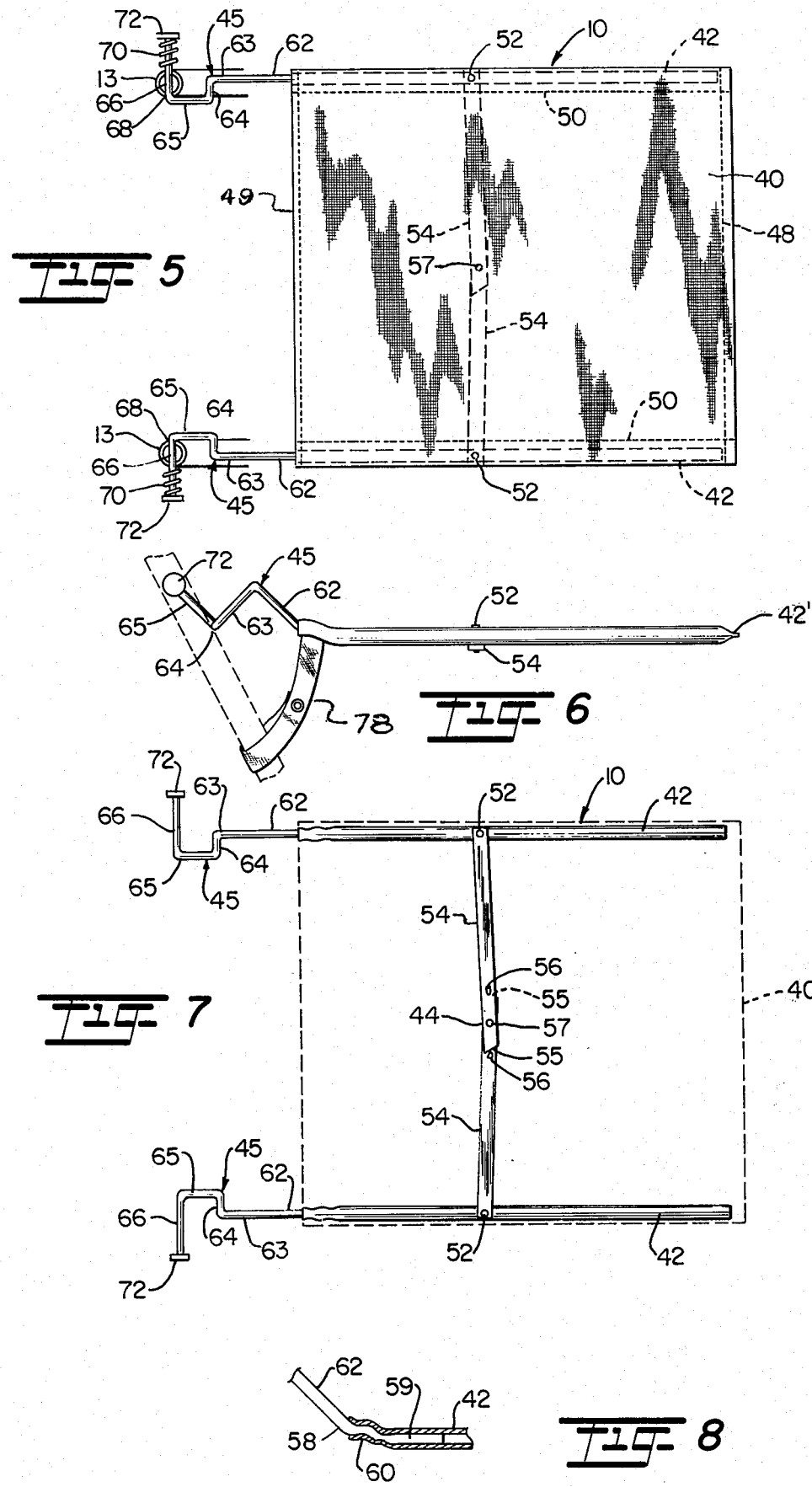

FOLDABLE CANOPY FOR BABY CARRIAGES

CROSS-REFERENCE TO RELATED PATENTS

Refer to U.S. Pat. No. 3,390,893, granted July 2, 1968 to O. F. MacLaren for STRUCTURES FOR FOLDING BABY CARRIAGES, CHAIRS, AND THE LIKE.

This invention generally relates to a shade or canopy device adaptable for use with baby strollers and more specifically relates to a canopy which is releasably connectable to the upper handle sections of a stroller in such a way as to be readily movable between a horizontal extended position and a compact folded position.

BACKGROUND AND FIELD OF THE INVENTION

A baby carriage or stroller has been devised of the type in which a pair of cross frames are interpivotally connected to one another and to diagonal brace members to form a rigid structure which can be selectively folded into a compact stored position. A baby carriage of this type is disclosed and set forth in the hereinbefore referred patent to MacLaren U.S. Pat. No. 3,390,893 and is characterized in particular by its rigidity when in the extended or unfolded position and further by its ability to be folded in mutually perpendicular directions so as to occupy a minimum of space. Specifically, the diagonal brace members which terminate at their lower ends in front wheel members and at their upper ends in handle portions, can be folded in half and selectively folded inwardly into closely spaced parallel relation to one another to occupy a minimum of space. The type of stroller described presents certain problems with respect to utilization of a shade or canopy which can extend horizontally in spaced relation above the seat portion of the stroller and yet be capable of being folded together with the other stroller parts into a compact position when not is use and without removal of the shade or canopy from the stroller. In this respect, it is desirable that the canopy be movable between a horizontal extended position over the seat portion and a rearward, downwardly extending position behind the stroller when not in use. In the former position, the canopy will of course act as a protective covering over a child when seated in the stroller, and in the latter position permits more ready access to the child, for example, when he is placed into or removed from the stroller. In either position, it is desirable that the canopy be readily foldable with the stroller into a compact condition without necessity of removing the canopy from the stroller; yet will require a minimum number of parts in supporting and connecting the canopy on the stroller.

SUMMARY

It is therefore an object of the present invention to provide for a novel and improved foldable canopy specifically adapted for use with baby carriages.

It is another object of the present invention to provide for a foldable canopy for baby strollers and the like which can be either releasably or permanently attached to the stroller, is comprised of a minimum number of parts, and is readily movable between an extended position and an out-of-the-way position when in use and a compact folded position for storage with the stroller.

It is a further object of the present invention to provide a folding canopy for baby carriages and the like which employs a unique form of end connector to facilitate releasable connection to the baby carriage and in such a way as to permit the canopy to be self-supporting in its horizontal extended position when in use without the aid of additional brace members and to further facilitate movement to an extended out-of-the-way storage position when not in use, and further permits ready collapse of the canopy into a folded position together with the carriage when not in use.

It is an additional object to provide in a baby carriage which is transversely foldable into a position occupying a minimum space for a folding canopy which can be readily collapsed with the other parts of the stroller into a compact stored position.

In accordance with the present invention there has been devised a novel and improved form of shade or canopy for a baby carriage, the canopy being so constructed and arranged as to facilitate releasable connection to the upper handle portions of the baby carriage. In connected relation, releasable connectors form a part of the end support members on opposite sides of the canopy which will support the canopy for forward horizontal extension over the seat portion of the carriage and also will permit the canopy to be pivoted or swung rearwardly about the handle portion into a downwardly extending position behind the carriage. Additionally, the end support members together with a cross brace member can be selectively released to permit the canopy to be folded inwardly, when it is desired to store the baby carriage, without releasing the canopy from the baby carriage.

In the preferred form, the folding canopy of the present invention is specifically intended for use with a baby carriage of the type having a main diagonal brace member terminating in upper handle portions, a lower horizontal seat portion, and supporting frame members between the diagonal brace members. In the baby carriage, the supporting frames cooperate with the diagonal brace members to support the baby carriage in a substantially rigid, extended position when in use and are foldable to permit inward collapsing of the diagonal brace members toward one another as well as to be folded in half into a compact stored position. The canopy includes a cloth-like covering and side frame members extending along opposite sides of the canopy which frame members are adapted when connected to the baby carriage to extend forwardly in the direction of travel of the carriage. A releasable brace for the canopy extends transversely between the side frame members to hold the covering in a normally extended position and is further releasable to permit the covering to be collapsed inwardly in a direction permitting the side frame members to move inwardly toward one another into closely spaced parallel relation when the carriage is to be folded up. In order to releasably connect the canopy to the upper handle portions of the carriage, an end support member forms a rearward continuation of the rearward end of each side frame member, the end support being in the form of a rod or substantially rigid wire which is bent to define a terminal connector and an offset limit stop which will engage the diagonal brace to limit forward and downward movement of the canopy to a position extending horizontally and forwardly in spaced relation above the seat portion. Slight inward pressure applied to the end support members will permit the offset limit stop to clear the diagonal base members for pivotal movement of the canopy from a position extending horizontally and forwardly over the seat portion to a downwardly extending position behind the carriage. In the latter postion, suitable means may be provided for attachment of the canopy to one of the supporting frames in order to secure it in an out-of-the-way position.

The folding canopy as described is further characterized in that it can be readily folded inwardly into a collapsed position either from the horizontally extending position or downwardly extending position behind the carriage simply by releasing the releasable base members extending between the side frame members thereby permitting the canopy to be folded up with the baby carriage for storage.

The above and other objects of the present invention will become more readily appreciated and understood from a consideration of the following detailed description when taken together with the accompanying drawings, in which:

FIG. 2 is a perspective view of the preferred form of canopy of the present invention installed on a baby carriage and illustrating the manner in which the canopy is folded between the diagonal brace members of a baby carriage for storage purposes.

FIG. 3 illustrates the canopy in a folded position between the diagonal brace members in the process of folding the baby carriage into a compact stored position.

FIG. 4 illustrates the manner in which the preferred form of canopy of the present invention may be pivoted between a forwardly extending horizontal position and a rearwardly and downwardly extending position behind the baby carriage.

FIG. 5 is a top plan view in more detail of the preferred form of canopy, in accordance with the present invention.

FIG. 6 is a side view in detail of the preferred form of canopy.

FIG. 7 is a bottom plan view of the preferred form of canopy of the present invention; and FIG. 8 is a fragmentary view in detail illustrating the preferred form of interconnection between the end support and each side frame member of the canopy.

DETAILED DESCRIPTION

Figure 1:
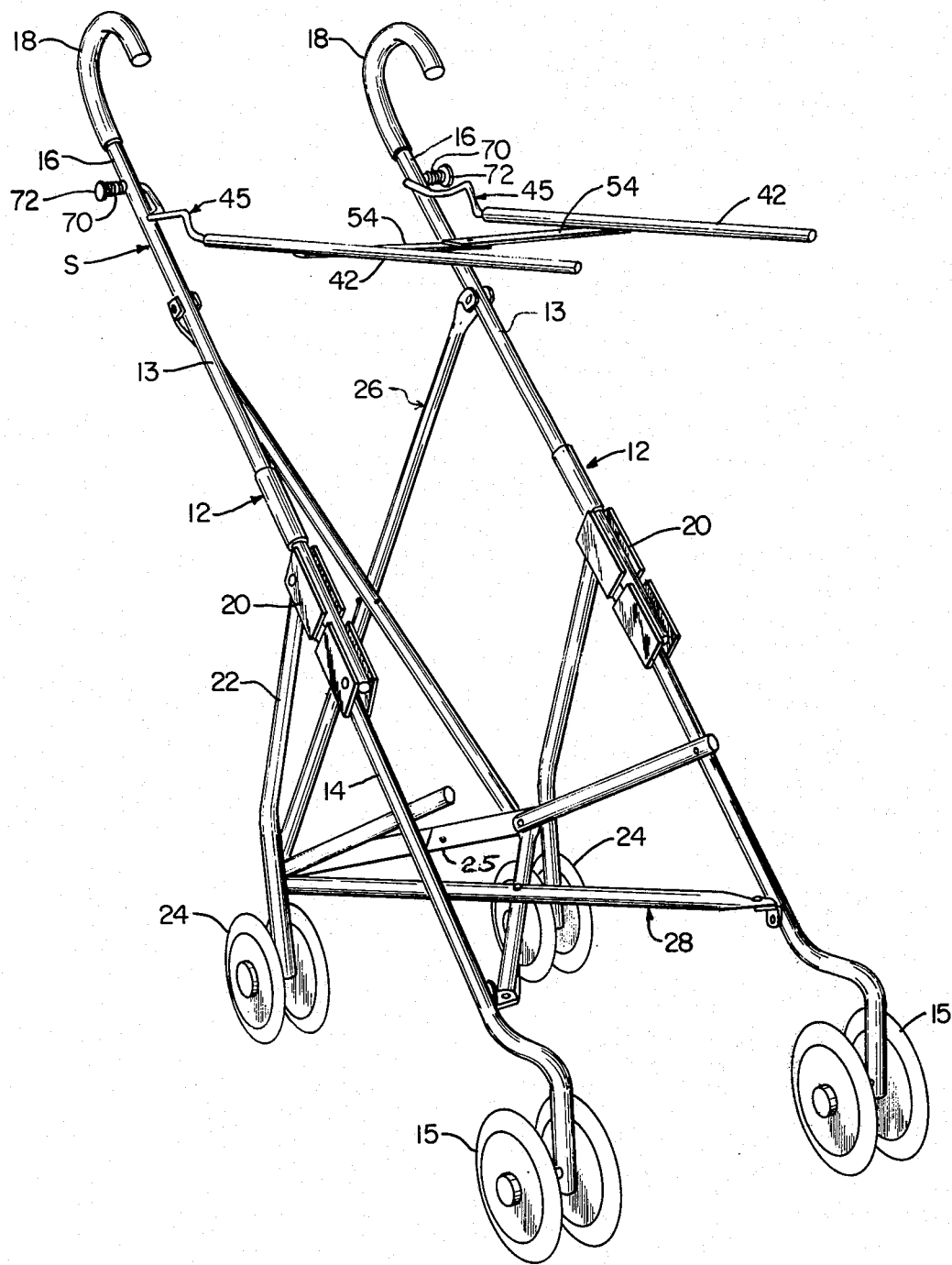
FIG. 1 is a perspective view of a preferred embodiment of the present invention mounted on a baby carriage with the canopy extending forwardly over the seat portion of the baby carriage.

Referring in detail to the drawings, there is shown by way of illustrative example in FIGS. 1 to 4 a preferred form of folding canopy 10 mounted on a baby carriage or stroller S. While the canopy 10 is readily conformable for use with various types of different strollers, its advantages and features are best exemplified by describing its use in association with a stroller which can be "stick folded" or transversely folded, such as, the type disclosed in the hereinbefore referred to patent to MacLaren U.S. Pat. No. 3,390,893. As a setting for the present invention, the specific type of stroller referred to is generally shown in FIG. 1 and is seen to comprise a pair of diagonal brace members 12 each made up of a pair of upper and lower pivotally interconnected tubular portions 13 and 14, respectively, the lower brace section 14 of each brace member 12 terminating in a front wheel assembly 15, and the upper section 13 terminating in handle portions 16 each having a reverse curved handle grip 18. Pivot joints 20 serve to interconnect the upper and lower base sections 13 and 14 to permit folding of ech brace member about itself, and rearwardly and downwardly inclined struts 22 extend from pivotal connection to the pivot joints 20 for termination in rear wheel assemblies 24.

In order to rigidify the entire structure as described, a pair of X-shaped frames 26 and 28 are pivotally interconnected to one another and to the brace members 12 in such a way as to form a rigid structure with the brace members 12 and a lower pivotal brace member 25 when the brace members 12 and 25 are locked in the extended position as shown; and when the brace sections 13 and 14 are released by the pivot joints 20 to permit folding or pivoting of the upper and lower brace sections 13 and 14 toward one another, and the brace member 25 is partially folded, the cross frames 26 and 28 can be folded inwardly so as to permit simultaneous inward folding both of the cross frames and diagonal brace members toward one another with the diagonal elements of each cross frame more nearly parallel to one another, as illustrated in FIG. 3.

The stroller S as shown in FIG. 4 also suitably includes a fabric or other cloth-like seat portion 30 and upright back portion 32 secured for extension between the diagonal brace members, and the canopy 10 of the present invention is shown extending horizontally above the seat portion to serve as a protective covering for the child. Again the stroller is described as merely representative of various commercially available strollers, and a more detailed understanding of the construction of the stroller S may be gained from U.S. Pat. No. 3,390,893.

As shown in FIG. 1, the canopy 10 is releasably connected to the upper extremities of the diagonal brace members 12 adjacent to the handle portion 16 for normal horizontal extension above the seat portion 30. Additionally, the canopy is so constructed and arranged in a manner to be described as to permit inward folding or collapse, as shown in FIGS. 2 and 3 between the diagonal brace members 12 when it is desired to store or fold up the stroller, as shown sequentially in FIGS. 2 and 3; or the canopy may be pivoted rearwardly as shown in FIG. 4 for downward substantially vertical extension directly behind the diagonal brace members 12 so as to place the canopy in an out-of-the-way position.

The detailed construction and arrangement of the preferred form of canopy 10 can be best seen from FIGS. 5 to 8, the canopy comprising a fabric or cloth-like cover portion 40, spaced parallel side frame members 42, and a transversely extending, releasable brace member 44 interconnecting the side frame members 42. An end support member 45 extends rearwardly from each of the side frame members 42 for releasable connection of the canopy to the upper end of the stroller.

Now considering the various component parts of the canopy in more detail, the cover portion 40 may be composed of various synthetic or natural fabric or fibrous materials such as Nylon, and is of generally rectangular configuration having reinforcing seams 48 and 49 along its front and rear edges, respectively, and opposite side seams 50 which form tubular openings for insertion of the side frame members 42. Preferably, the side frame members are in the form of metal lightweight tubes and, for example, may be composed of aluminum which are dimensioned to be of a length to extend for the full length of the canopy along its opposite side or lateral edges as shown.

The transverse releasable brace member 44 preferably extends medially between the side frame members 42 with opposite ends extending through interruptions or openings in the seams 50 of the canopy for pivotal connection as at 52 to the side frame members and specifically at a point located somewhat nearer to the rear than to the forward ends of the side frame members in order to facilitate grasping and release or folding of the base member as illustrated in FIG. 2.

Although various forms of bracking means may be utilized, in the preferred form, the releasable brace 44 is defined by a pair of identical elongated, narrow flat bars 54, each correspondingly including an inner inclined or beveled end 55 and an upstanding pin 56 in adjacent spaced relation to the inclined end 55 and separated by an interconnecting pivot pin 57. The bars 54 are interconnected with their inner ends in opposed facing relation so that the inclined end 55 of one bar is movable into abutting relation to the limit pin 56 of the other bar 54; and, the limit pins 56 are so located with respect to the inner ends as to permit the bars to advance slightly past center or parallel alignment, as seen from FIGS. 5 and 7, so as to abut one another in compression and prevent accidental release until positively retracted or folded as shown in FIG. 2.

An important feature of the present invention resides in the particular construction and arrangement of the preferred form of end support member 45 which forms a rearward continuation of each side frame member 42. Preferably, each end support includes an elongated heavy wire or rod 58 having a leading end or extremity 59 which, as shown in FIG. 8, is inserted into the rearward end of each side frame 42, and the tubular side frame 42 and inserted end 59 are crimped together into a generally W-shaped configuration as indicated at 60, so that the side frame will form a rigid extension of the end support rod 58. The rod 58, when viewed from the side, as shown in FIG. 6 with the side frame extending horizontally in a forward direction is bent upwardly at substantially a 45° angle as at 62 then is bent in a reverse direction downwardly as at 63 to form a substantially 90° included angle with the portion 62. As shown in the plan view of FIG. 7, portion 63 continues into a lateral offset portion 64 which is bent transversely and inwardly toward the opposite portion 64 substantially at 90° to the portions 62 and 63 then continues rearwardly into an upwardly inclined portion 65 and terminates in a transversely and outwardly extending extremity 66, the latter being dimensioned to be of a length sufficient to pass through an opening 68 in one of the upper brace sections 13 of the brace members 12. The extremity 66 which forms the releasable or terminal connecting end of the end support 45 is preferably of a length to extend substantially beyond the brace section in order to receive a coiled spring 70 which is mounted under compression between the external surface of the brace section 13 and a nut or head 72 which is releasably pressfit over the free end of the extremity 66.

It will be appreciated that when the end supports 45 have their rearward extremities 66 inserted outwardly through the openings 68 in each of the brace sections 13 and are spring-loaded by the spring member 70 to urge the rearward inclined portion 65 against the insides of the brace sections 13 that the lateral offset 64 will normally limit downward movement of the canopy to a position extending horizontally and forwardly from the brace members, as shown in FIG. 1, when the canopy is in use. Hold-down straps 78 may be used to secure the canopy in position to prevent vibration or movement when the canopy is in use.

As a preliminary to folding of the stroller S, the canopy 10 is first collapsed by releasing the base member 44 as illustrated in FIG. 2 followed by pressing inwardly against the end supports 66, and specifically against the loading of the spring 70 until the offsets 64 clear the brace sections 13, at which point slight downward movement of the canopy will cause the inclined portions 63 to move inwardly between the brace members and prevent return of the end supports to their extended positions under the loading of the spring 70. The canopy can then be pushed downwardly and inwardly as illustrated in FIG. 3 until it extends parallel to the diagonal brace members.

Referring once again to FIG. 4, the versatility of the canopy is illustrated and specifically its ability to be pivoted into an out-of-the-way position behind the stroller when the stroller is in use. Essentially the same procedure is followed as described with reference to FIGS. 2 and 3 in that the brace member 44 is first released and the hold-down straps 78 are unsnapped. The end supports are then forced inwardly as the canopy is swung rearwardly so that the side frames 42 will clear the insides of the diagonal brace members 12. The canopy once it clears the brace members 12 can be advanced to a position extending in closely spaced parallel relation to the brace members 12 and releasably secured behind the brace members by means of the straps represented at 78. If it is desired to fold up the entire stroller when the canopy is in the latter position, it is merely necessary to assure that the releasable brace is partially folded then to fold the canopy inwardly between the brace members as the stroller is folded up for storage.

From the foregoing, it will be seen that the canopy of the present invention is characterized by employing a minimum number of lightweight parts and which is simple to install and to manipulate between its extended and folded positions. It is therefore to be understood that various modifications and changes may be made in the specific construction and arrangement of parts without departing from the spirit and scope of the present invention, as defined by the appended claims.

What is claimed is:

1. In a baby stroller of the type having main diagonal brace members terminating in upper handle portions, a seat portion, and supporting frame means between said diagonal brace members cooperating to support said baby carriage with said diagonal brace members spaced apart in an extended position when in use and being foldable to permit inward collapsing of said diagonal brace members toward one another when not in use into a compact stored position, the combination therewith of:

a canopy including a flexible cover and side frame members extending along opposite sides of said canopy and adapted when connected to said baby carriage to extend forwardly in the direction of travel of the baby carriage;

an end support member at the rearward end of each side frame member for releasable connection of each side frame member to one of said brace members adjacent to its upper handle portion, each end support member including terminal connecting means connected to a diagonal brace member to permit pivotal swinging movement of said cnaopy about said terminal connecting means and limit stop means on said end support normally limiting forward and downward movement of said canopy to a position extending horizontally and forwardly from said diagonal brace members in spaced relation above the seat portion of said baby carriage; and releasable brace means extending transversely between said side frame members for holding said canopy in an extended position and being releasable to permit said canopy to collapse inwardly in a direction permitting said side frame members to move inwardly toward one another into closely spaced parallel relation to one another, said releasable brace means being defined by a pair of bars extending transversely inwardly toward one another from said opposite side frame members at a location relatively near the rearward end of said canopy, said bars being pivotally interconnected and having limit stops limiting pivotal movement of said bars to slightly beyond fully extended position, the flexible cover and said bars being dimensionally proportioned such that said flexible cover is elastically stressed in tension when said bars are fully extended whereby said bars are forcibly retained against said limit stops and said opposite side frame members are braced in rigid spaced-apart relation to one another.

2. In a baby stroller according to claim 1, each said end support member including a forward connecting end connected to a respective side frame member, said limit stop means including an offset limit stop member having a generally inverted V-shaped section extending rearwardly from each forward connecting end having a portion extending laterally inwardly, and a rearward continuation of said offset stop limit member terminating in said terminal connecting means, and said terminal connecting means being defined by a rod-like portion extending in a direction transversely of the direction of extension of said canopy for insertion through a transverse opening in one of the diagonal brace members, and biasing means spring-loading said terminal connecting means when inserted through the opening to cause said limit stop means normally to engage the upper surface of the associated diagonal brace member.

3. In a baby stroller of a type having diagonal brace members foldable in a direction inwardly toward one another, said diagonal brace members terminating in upper handle portions, the combination therewith of:
a canopy including a cloth-like covering;
opposite side frame members extending along opposite sides of said canopy;
an end support member at the rearward end of each side frame member, said end support member being defined by a rod having a forward connecting end attached to and extending from the rearward end of a side frame member, an offset limit stop section of inverted V-shaped configuration extending rearwardly from each forward connecting end and being provided with a transversely extending portion at its rearward end, an upwardly inclined portion extending rearwardly from the transversely extending portion, terminal connecting means adapted to be pivotally connected to one of said diagonal brace members adjacent to its upperhand portion and being defined by a continuation of said upwardly inclined portion extending transversely therefrom for insertion through an opening in one of said diagonal brace members, and resilient means on said terminal connecting means yieldably urging each end support member in a direction causing said transversely extending portion of said offset limit stop member to engage one of said diagonal brace members by extending above and across said diagonal brace member when said canopy is in rigid extended position; and
a releasable brace member extending between said side frame members including pivot means releasable to permit movement of said releasable brace member between a rigid extended position bracing said side frame members in spaced-apart relation and a folded position permitting said opposite side frame members to be collapsed inwardly toward one another.

4. In a baby stroller according to claim 3, said terminal connecting means being spring-loaded to normally urge said lateral offset limit stop members to a position engageable with each respective diagonal brace member and said terminal connecting means being further movable inwardly toward one another whereby to cause said lateral offset limit stop members to be urged inwardly to a position permitting said canopy to be pivoted between a forward horizontally extending position and a rearward downwardly extending position behind said diagonal brace members.

\* \* \* \* \*